L. W. SOULE.
AUTOMOBILE SIGNAL.
APPLICATION FILED AUG. 7, 1920.
1,398,923.
Patented Nov. 29, 1921.
2 SHEETS—SHEET 1.
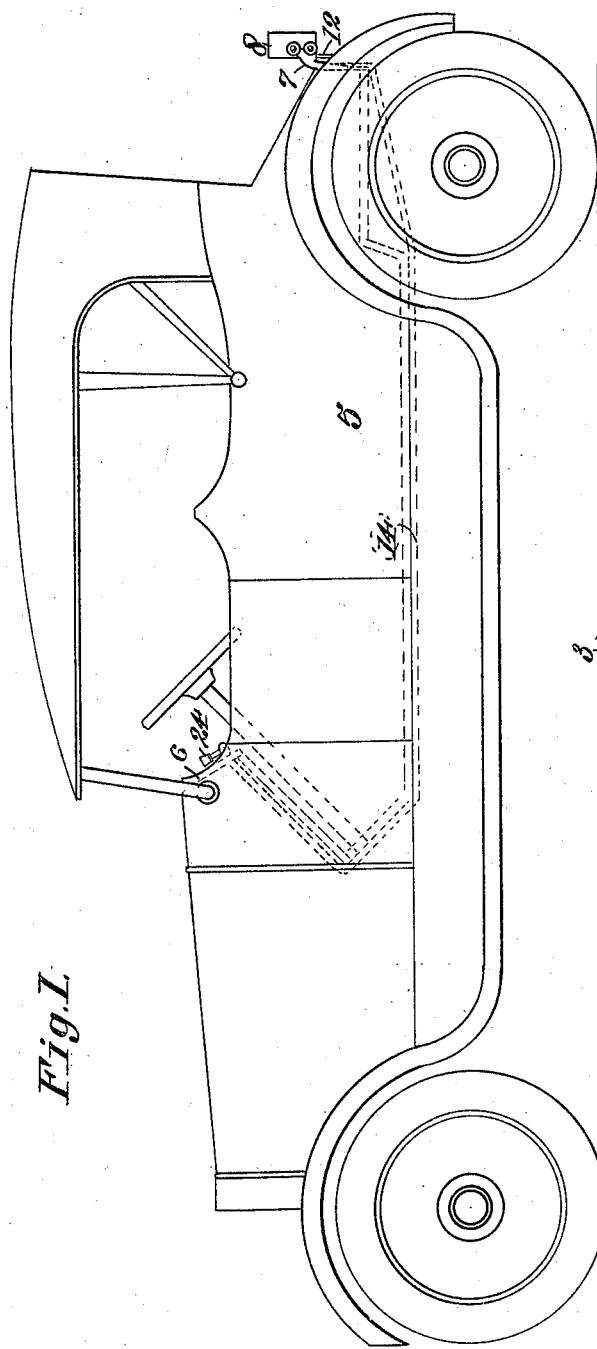
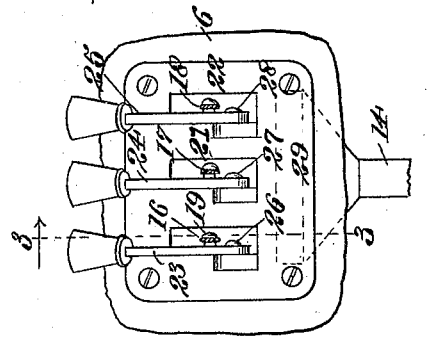
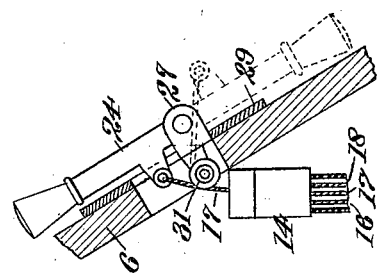
Inventor.
Leslie W. Soule.
By Victor J. Evans
Attorney L. W. SOULE.
AUTOMOBILE SIGNAL.
APPLICATION FILED AUG. 7, 1920.
1,398,923.
Patented Nov. 29, 1921.
2 SHEETS—SHEET 2.
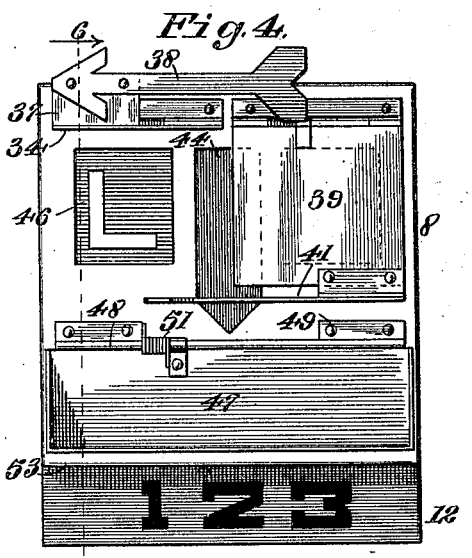
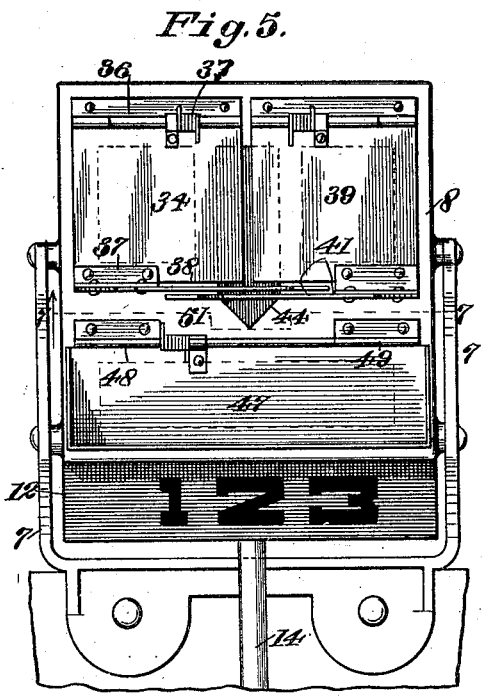
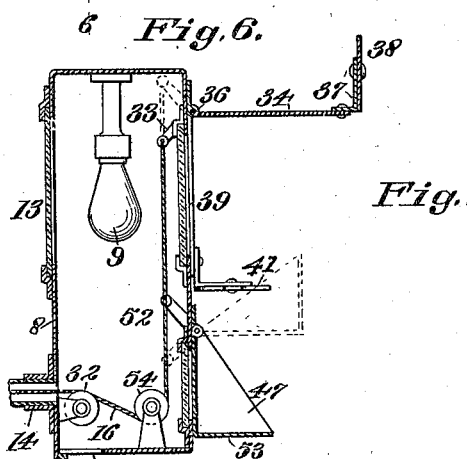
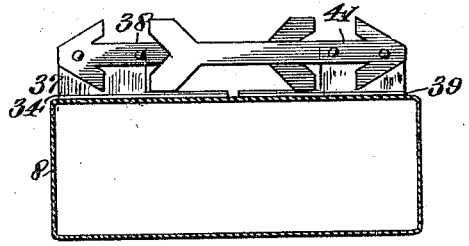
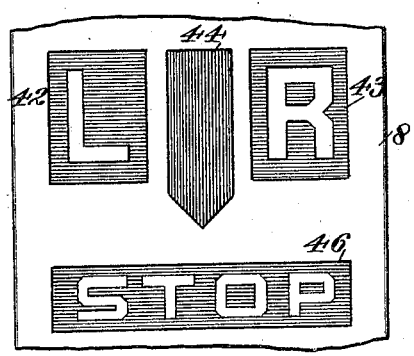
Inventor.
Leslie W. Soule
By Victor J. Evans
Attorney.

UNITED STATES PATENT OFFICE.

LESLIE W. SOULE, OF SEATTLE, WASHINGTON.

AUTOMOBILE-SIGNAL.

1,398,923.　　　　　Specification of Letters Patent.　　Patented Nov. 29, 1921.

Application filed August 7, 1920. Serial No. 401,877.

*To all whom it may concern:*

Be it known that I, LESLIE W. SOULE, a citizen of the United States, residing at Seattle, in the county of King and State of Washington, have invented new and useful Improvements in Automobile-Signals, of which the following is a specification.

This invention relates to a new and useful improvement in automobile signals, and relates particularly to that type of signal which is adapted to be attached to the rear of an automobile for the purpose of indicating the direction of a maneuver which the driver of the car is about to execute.

The principal object of this invention is to provide a signal of the character above mentioned, which will be visible day or night.

Another object of this invention is to provide a signal which will be universally adaptable by displaying characters, one of which may be locally understood and the other of which may be internationally understood.

Another object of this invention is to provide a signal which is mechanically and positively operated, thereby eliminating the disadvantages of electrical signals.

A further object of this invention is to provide a signal which may be readily attached to any variety of car at a nominal cost and which can be applied to a car without materially altering the construction thereof.

A still further object of this invention is to provide a device of the above mentioned character, which is simple in construction, inexpensive to manufacture, strong, durable, and reliable in character.

Other objects and advantages of this invention will be apparent during the course of the following description:—

In the accompanying drawings, forming a part of this specification in which like numerals are employed to designate like parts throughout the same, Figure 1 is a side elevation of an automobile having my signal applied thereto.

Fig. 2 is a fragmentary view of the dashboard of a car having my signal control levers mounted thereon.

Fig. 3 is a cross-section taken on a line 3—3 of Fig. 2.

Fig. 4 is an elevation of my signal box in operation for a left-hand turn.

Fig. 5 is an elevation similar to Fig. 4, but displaying no signals.

Fig. 6 is a cross-section on a line 6—6 of Fig. 4.

Fig. 7 is a cross-section on a line 7—7 of Fig. 5.

Fig. 8 is a bottom plan view of Fig. 4, and

Fig. 9 is a fragmentary view of the location of the illuminated letters.

In the accompanying drawings wherein for the purpose of illustration is shown a preferred embodiment of my invention, numeral 5 designates an automobile as a whole, the same having a dash-board 6 and a lamp supporting bracket. This bracket 7 is commonly adapted to support a signal light and a license plate. These I remove and employ the bracket 7 to support the signal box indicated as a whole by numeral 8.

This box is preferably rectangular in shape and is adapted to house a lamp 9, which lamp is adapted to illuminate the interior of said box and to project its rays through an orifice 11 to the license plate 12.

At 13 I have shown a sliding member by means of which access may be gained to the interior of the box 8 for the purpose of making adjustments or repairs.

At 14 I have shown the end of a pipe adapted to have communication with the interior of the box 8 and leading, as shown in dotted lines in Fig. 1 to the dash-board 6. This pipe 14 is adapted to house a series of cables 16, 17 and 18, the ends of which are connected to pins 19, 21 and 22, carried upon levers 23, 24 and 25, pivoted as shown at 26, 27 and 28 to a plate 29 carried upon the dashboard 6.

A roller is mounted to the rear of each of the levers 23, 24 and 25 so that the ends of the cables 16, 17 and 18 will ride over the same as shown at 31 of Fig. 3 when the lever is thrown to the dotted line positioned as shown in this figure.

The purpose of moving these levers to the dotted line position will be hereinafter shown, and it will be noted that the arrangement is such that the end of the cable passes the pivot point 27 when the tension thereon serves to hold the lever to which the cable is attached in either of its positions.

By again referring to Fig. 6 it will be noted that a roller 32 is provided adjacent the end of the pipe 14 over which the cables 16, 17 and 18 pass. In this figure but one cable is shown as the same are all in line therewith.

The cable is attached to an arm 33, which arm is connected to a door 34 hinged at 36 near the top, left-hand portion of the box 8 as best shown in Fig. 5. A spring 37 is provided for the purpose of normally holding this door 34 in intimate contact with the face of the box 8. This door 34 carries at its lower edge an angle member 37', to which an arrow 38 is attached. This arrow 38 is so positioned as to point toward the left of the box as shown in Fig. 4 and when this door is in its closed position this arrow is practically invisible to the approaching vehicle, as is best shown in Fig. 5.

The cable 18 is attached to an arm similar to the arm 33, which arm operates a door 39, similar in all details to the door 34, with the exception that the arrow 41 points toward the right and is positioned so as to be out of the line of movement of the arrow 38.

These doors 34 and 39 serve to cover orifices 42 and 43 cut in the face of the box 8. These orifices may be closed by plates of glass or metal, having letters formed thereon through which light may be projected from the lamp 9.

An orifice is provided between the orifices 42 and 43, within which a red glass is positioned, the same being visible at all times as shown in Fig. 5.

Beneath these orifices 42, 44 and 43 is an orifice 46, within which is positioned a glass or metal member having the word "Stop" thereon and capable of having light projected therethrough. This orifice 46 is covered by a member 47 hinged as shown at 48 and 49 and having a spring 51 which normally holds the same in intimate contact with the face of the box 8. This hinged member 47 is moved about its pivots 48 and 49 through the medium of an arm 52, which is attached to the cable 17.

The word "Stop" is painted upon the surface 53 of the member 47 as shown in Fig. 8. A series of pulleys 54 are positioned upon the bottom of the box 8 so as to guide the cables 16, 17 and 18 to their respective arms.

In operation, assuming that the driver desires to turn to the left, he moves the lever 23 from the position shown in Fig. 2 to the dotted position shown in Fig. 3, which causes the cable 16 to move through the pipe 14, over pulleys 32 and 54 and to raise the door 34 through the action of the arm 33. This raising of the door displays the arrow 38 as shown in Fig. 4, the same being made of a bright color and consequently will attract attention. As the arrow is a universal sign of direction, this will be understood in all parts of the world.

Should it be night, the illumination of the letter "L" will become visible upon the raising of the door 34, consequently the driver's intentions can be readily seen. Should it be desired to execute a right-hand turn, the lever 35 will be thrown and the same action will take place as has just been described, with the exception that the door 39 will be raised and the arrow 41 will be brought into view. If it be night, the letter "R" will be made visible.

It is, of course, understood that as soon as the maneuver has been completed, the levers 23 or 25 will be thrown to their upper position by the operator. Should the driver desire to stop, he will throw the middle lever 24, which will operate the cable 17, to cause the member 47 to be raised. If it be day time, the word "Stop" upon the face 53 will become visible to the following machine. If it be night, the illuminated letters contained in the orifice 46 will become visible, and consequently indicate the intentions of the driver.

It will thus be seen that I have produced a signal, which is simple in construction and one which is legible at all times and may be thoroughly understood under all conditions.

It is to be understood that the form of my invention herewith shown and described is to be taken as a preferred example of the same, and that various changes in the shape, sizes and arrangement of parts may be resorted to without departing from the spirit of the invention or the scope of the subjoined claim:—

Having thus described the invention, I claim:

In an automobile signal, a box having a series of orifices in parallel arrangement adjacent to the upper portion of said box, an elongated orifice formed beneath said first mentioned orifices, doors adapted to close two of said first mentioned orifices, a hinged member adapted to normally close said elongated orifice, means for moving said doors and hinged member independently through an arc of 90 degrees and an arrow attached to each of said doors, so as to point in opposite directions, the contour of said arrows being invisible when said doors are in their normal position.

In testimony whereof I have affixed my signature.

LESLIE W. SOULE.